July 25, 1967 G. KRAUSE 3,333,055
APPARATUS FOR INCREASING THE SIGNAL-TO-NOISE RATIO OF A TELEVISION SIGNAL
Filed May 28, 1964
4 Sheets-Sheet 1
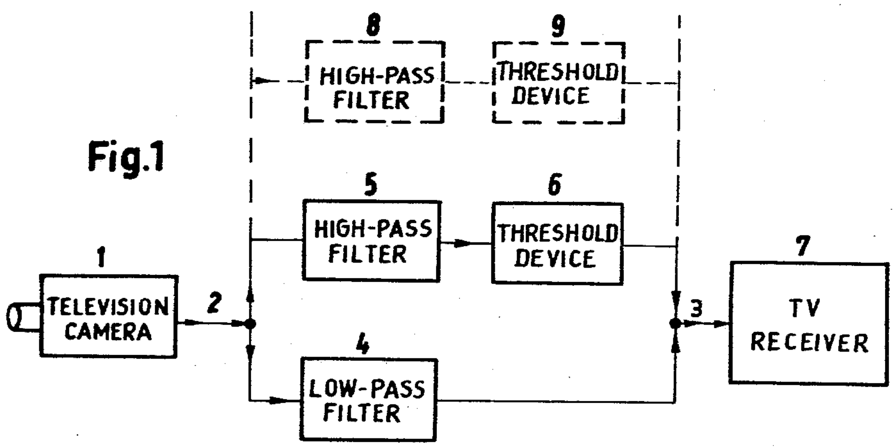
Fig.1
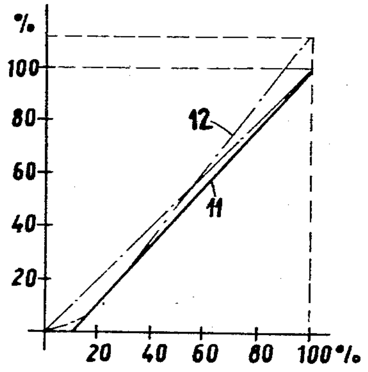
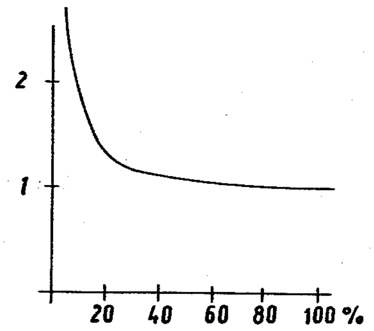
Fig.2 Fig.3
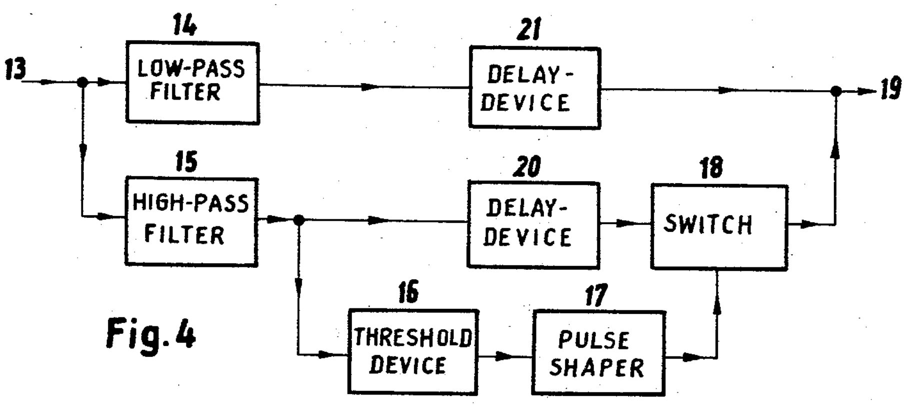
Fig.4
Inventor:
Gerhard Krause
by Michael S. Striker
Attorney Jnventor:
Gerhard Krause by Michael J. Striker
Attorney Jnventor:
Gerhard Krause by Michael J. Striker
Attorney Inventor:
Gerhard Krause
by Michael J. Striker
Attorney United States Patent Office 3,333,055
Patented July 25, 1967

3,333,055

APPARATUS FOR INCREASING THE SIGNAL-TO-NOISE RATIO OF A TELEVISION SIGNAL

Gerhard Krause, Darmstadt, Germany, assignor to Fernseh G.m.b.H., Darmstadt, Germany Filed May 28, 1964, Ser. No. 371,006
Claims priority, application Germany, June 1, 1963, F 39,893
6 Claims. (Cl. 178—6)

ABSTRACT OF THE DISCLOSURE

The low-frequency and high-frequency components of a television signal are separated by band pass filters. The high frequency portion of the signal containing most of the noise is transmitted to a threshold device designed to inhibit any signal below a predetermined threshold value. The output of the threshold device is, accordingly, relatively free of noise. The output of the threshold device is then combined with the low frequency components of the television signal to provide a signal having a relatively high signal-to-noise ratio.

The present invention relates to method and apparatus for increasing the signal-to-noise ratio in transmission systems for television signals. The invention is of particular importance in systems in which interference (noise) becomes superimposed upon television signals in the transmission path. The invention is thus of particular importance in connection with apparatus for magnetic storage of television signals. In apparatus of this kind even when a low-noise television signal is recorded there appears in the reproduced signal an additional noise component which predominantly is due to the magnetic storage operation, so that the reproduced signal possesses a substantially lower signal-to-noise ratio than the initial signal. Apparatus according to the invention can also be used with advantage when television or other wide band signals are transmitted over great distances by way of coaxial leads or by radio, for example by links or satellites.

Therefore, it is an object of the invention to provide a new method of increasing the signal-to-noise ratio in television signals by filtering out some parts of the frequency band, in which the noise amplitude is more disturbing than in other frequency bands.

A further object of the invention consists in a method of increasing the signal-to-noise ratio of a television signal without substantial distortion of the original signal.

It is another object of the invention to provide a new apparatus and circuit arrangement for increasing the signal-to-noise ratio of a television signal.

The invention arises from the realization that in a television signal components of higher frequencies, for example above 500 kc./s. appear relatively seldom. Television systems used at present transmit the television signal continuously with the full bandwith of for example 5 mc./s. The result of this is that disturbances contained in the signal or added to it in the transmission path are continuously present at the output of the transmission line even when the higher frequency portions of the frequency band are at the time not providing a part of the television signal. In addition to this the eye is particularly sensitive to noise and interference in just those large areas of uniform brightness in the television picture where the television signal is relatively free from high frequency components.

By the use of the present invention the signal-to-noise ratio may be substantially increased as compared with normal television transmission systems in those portions of the television picture in which there are no sudden changes in brightness. Only in the small portions of the picture signal which occur during and shortly after a sudden change in brightness does the signal-to-noise ratio remain unaltered. By separation into more than two channels the signal-to-noise ratio may be improved even during the sudden change in brightness, since the low frequency noise is then absent from the open high frequency channel. The improvement in signal-to-noise ratio is, however, not as great as in the large area portions of the picture.

The improvement of the signal-to-noise ratio produced by the use of apparatus according to the invention is an objective gain. It is effective even when the television signal is made use of for scientific purposes. During a sudden change in brightness the positional information is particularly important; owing to the suddenness of the change, however, this is only slightly disturbed by the noise. On the other hand, in those portions of the television picture in which no sudden alterations of brightness occur, the reproduction of the amplitude free from distortion, and specifically free from noise, is important. When the television picture is subjectively evaluated an additional improvement is obtained because the noise occurs less often in those portions of the picture containing sudden changes in brightness (heavily contrasted details), and arises more particularly in large area portions of the picture with uniform brightness, where it may in practice be suppressed by the use of the method according to the invention.

The use of the present invention allows not only the suppression of noise but also of other types of disturbances such as interference and the formation of ghost images, provided that these disturbances have a smaller amplitude than the threshold level and are not transmitted over the low frequency signal path.

Although the novel features which are believed to be characteristic of this invention will be pointed out with particularity in the appended claims, the manner of its organization and the mode of its operation will be better understood by referring to the following description, read in conjunction with the accompanying drawings, forming a part thereof, of which:

FIG. 1 is a block diagram of a television transmission system employing the present invention;

FIG. 2 is a graph illustrating the distortion which the present invention may be employed to reduce;

FIG. 3 illustrates a possible characteristic for a circuit means used in carrying out the invention;

FIG. 4 is a block diagram illustrating an embodiment of a circuit arrangement according to the present invention;

Figure 5:
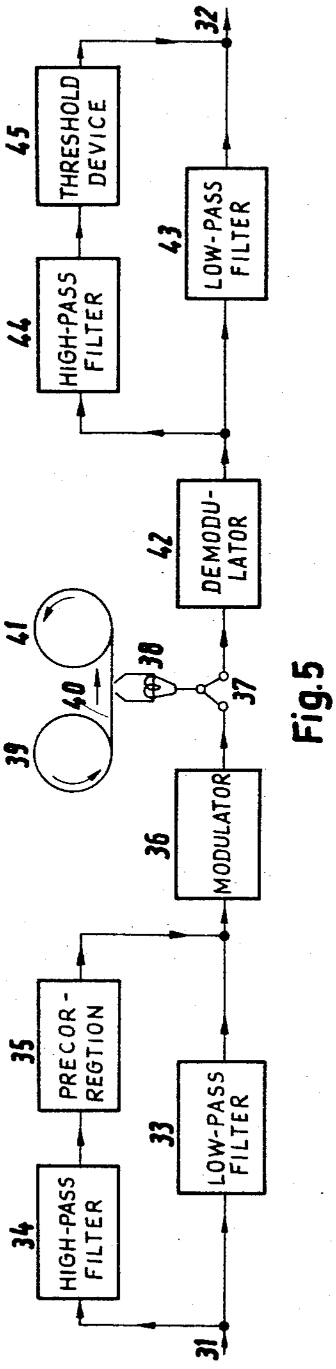
FIG. 5 is a block diagram illustrating the use of the present invention in apparatus for the magnetic storage and reproduction of television signals.

In the arrangement shown in FIG. 1 the device 1 represents a source of television signals which may, as indicated, be a television camera. Signals from camera 1 are applied by way of a lead 2 to a circuit arrangement according to the present invention. The signals from camera 1 are applied alike to a low-pass filter 4 and to a high-pass filter 5 which separate the applied signal into respective complementary low- and high-frequency components. The frequency limit between the two components may lie at 500 kc./s. The high frequency portion of the signal separated by filter 5 and comprising frequencies of for example 500 kc./s. to 5 mc./s. is applied to a threshold device 6 which is arranged to attenuate or suppress signals of amplitude not exceeding the noise level. The output signal from the threshold device 6 is then combined with the output from the low-pass filter 4, containing signal frequencies of 0 to 500 kc./s. and the recombined signal thus formed is applied by way of a lead 3 to a television receiver 7. When the television signal does not contain high frequency components, as is the case for example during the transmission of large areas of uniform brightness, the high frequency noise component is heavily attenuated or suppressed by the threshold device 6 and therefore does not appear in the output lead 3. Only when the signal does contain high frequency components, that is during the scanning of sudden changes in brightness, are the noise components transmitted through the high frequency channel 5, 6 at approximately full amplitude.

In the embodiment described above, which divides the signal bandwidth for the transmission of the television signal into two frequency bands, of which one or both may be used for transmitting the instantaneous signal content and in which the separation between the two channels is effected at a frequency of 500 kc./s., those portions of the picture in which no sudden alterations of brightness are present experience an improvement in the signal-to-noise ratio of 3.16 times, as compared with the usual transmission system, if the higher frequency signal components below the threshold level determined by the noise level are completely suppressed.

By dividing the total frequency band of the signal into more than two channels, as indicated in FIG. 1 by a further high-pass filter 9 and a subsequent threshold device 10, a still further increase in the signal-to-noise ratio may be obtained.

The graph given in FIG. 2 shows the relation between the output voltage of the high frequency channel of the apparatus described in relation to FIG. 1 and the input signal amplitude, on the assumption that signals of amplitude less than 10 percent of the maximum are attenuated or suppressed. In order partly to compensate the reduction in amplitude at higher input voltages, the transmission factor may be so chosen as indicated by line 11 in FIG. 2. By this means an input signal of 100 percent amplitude gives rise to an output signal of the corresponding amplitude. When the noise amplitude is small and the threshold level correspondingly low, the distortion resulting from the action of the threshold device may often be ignored. The subjective distortion may be still further reduced if the transmission factor is increased so that the maximum input voltage of 100 percent corresponds to a greater output voltage of, for example, 110 percent as is indicated in FIG. 2 by the curve 12 shown in chain line.

Another possibility for reducing transmission distortion is to introduce into the channel carrying the higher frequency signal components circuit means of which the transmission factor characteristic takes the form shown in FIG. 3, that is, a circuit arrangement which possesses a higher transmission factor for small signal amplitudes than for larger signal amplitudes and in which the transmission factor is reduced to unity for the maximum input voltage. By the use of such a circuit device with the ideal characteristic, which cannot however be obtained in practice in the neighborhood of the threshold level, it can be arranged that all signals of which the amplitude exceeds the threshold level are transmitted with approximately the correct amplitude.

FIG. 4 shows another embodiment of circuit means according to the invention by means of which the amplitude distortion for the higher frequency components discussed above may be avoided, though all signals of an amplitude which does not exceed the threshold level are completely suppressed. Signals received at a terminal 13 are again applied to a low-pass filter 14, and to a high-pass filter 15. From the high-pass filter the signal components in the higher frequency range pass to a threshold device 16 passing only signals of which the amplitude exceeds a predetermined level. The output signals from threshold device 16 are applied to a pulse shaper 17 which, whenever a signal is received from the threshold device, provides an output signal of constant amplitude which is applied to control a switch 18 through which the higher frequency signal components may then pass to an output terminal 19 at which they are re-united with the low frequency components from filter 14. In order to be able to transmit those portions of the rising edges of signal transients which lie below the threshold level of device 16, the high frequency signal components applied to switch 18 from high-pass filter 15 may be delayed by a delay equalizer 20 for a time sufficient to ensure that switch 18 will have responded to that portion of the transient which does exceed the threshold level before the lower amplitude portions of the transient reach the switch. A corresponding delay must then be introduced into the signal path between low-pass filter 14 and output terminal 19 by means of a delay equalizer 21.

The present invention is particularly important in transmission systems in which this interference is not present in the original signal but is superimposed upon the signal in the transmission path. It is then theoretically possible completely to remove the transmission distortion arising in the high-pass branch by precorrection of the signals at the beginning of the transmission channel. This makes the theoretical assumption that the transmitted frequency band is sharply limited and that the bandwidth of the transmission path is infinite. Even under practical conditions, however, very satisfactory results may be obtained.

As an example of a television transmission system in which interference is superimposed upon the signal in a transmission path, there may be considered the equipment for the magnetic storage of television signals which is schematically illustrated in FIG. 5. The magnetic tape 40 upon which signals are recorded and from which they are subsequently reproduced passes from a feed spool 39 to a take-up-spool 41 past a magnetic transducer head 38.

It is well known to those skilled in the art that in practical apparatus for recording wide band signals such as television signals upon magnetic tape the single head 38 shown in the drawing is as a rule replaced by a plurality of heads carried upon a rotating member and engaging the tape so as to record the signal in individual transverse tracks. Connections to the transducer head 38 are changed over for recording or for reproduction by means of a switch 37. In the recording mode switch 37 connects the transducer head 38 to a modulator 36 from which the signal to be recorded is applied to the head.

Signals to be recorded are received at an input terminal 31 and applied thence to a low-pass filter 33 and to a high-pass filter 34. Signals from filter 34 are applied to a precorrection circuit 35 which is arranged to increase the amplitude of signals of smaller amplitude to a greater extent than signals of larger amplitude. The precorrected high frequency signals from circuit 35 are then recombined with the unmodified low frequency signals from filter 33 and the recombined signal is applied to a modulator 36 yielding the drive signal which is applied by way of switch 37 to transducer head 38.

During reproduction, signals developed from tape 40 by transducer head 38 are applied to a demodulator 42 which yields the precorrected video signal, upon which noise has been superimposed as a result of the process of recording and reproduction. In accordance with the present invention this reproduced signal is applied to a low-pass filter 43 and to a high-pass filter 44, the output from which is applied to a threshold device 45. Device 45 is arranged to pass only those signals of which amplitude exceeds the noise level. It may in practice comprise an arrangement such as that already described in relation to FIG. 4. The output signals from device 45 are then recombined with the low frequency components from filter 43 to yield at an output terminal 32 a signal in which noise components have, to a considerable degree, been suppressed.

Figure 6:
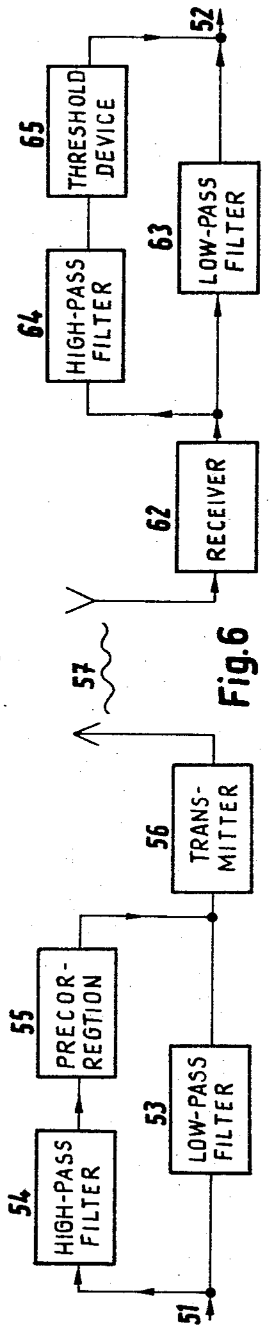
FIG. 6 is a block diagram of apparatus for transmitting a television signal by radio and making use of the present invention.

In the arrangement shown in FIG. 6 the invention is applied to a system in which television signals are transmitted over a radio link. Television signals to be transmitted over the link are received at an input terminal 51, from which they are applied to a low-pass filter 53 and to a high-pass filter 54, from which the high frequency signal components are applied to a precorrection circuit 55 similar to that forming unit 35 of FIG. 5. The signals from circuit 55 are recombined with the low frequency components from filter 53 and the recombined signal is applied to a radio transmitter 56 whence it is transmitted, as indicated by sinuous line 57, to a receiver 62. The demodulated signal from receiver 62 is applied to a low-pass filter 63 and to a high-pass filter 64, signals from which are applied to a threshold device 65, which again may be of the kind described in relation to FIG. 4. The output signals from device 65 and from low-pass filter 63 are recombined and tied to an output terminal 52 whence there may thus be taken a signal in which noise superimposed upon it during transmission has been substantially reduced.

FIGS. 7–10 indicate examples of ideal and of practically realizable amplitude characteristics of the threshold device used in accordance with the invention for suppressing or attenuating the high frequency signal components of small amplitude, and for the precorrection circuit arrangement which may be used to compensate for transmission errors introduced by the threshold device.

Figure 7:
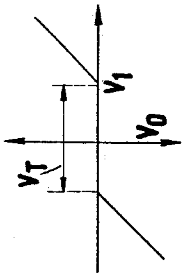
FIGS. 7–10 are graphs illustrating ideal and practical characteristics of circuit devices used in carrying out the present invention.

FIG. 7, in which output voltage $V_0$ is plotted against input voltage $V_1$, illustrates an ideal characteristic for a threshold device used in carrying out the present invention. It will be seen that for values of input voltage within an initial range on either side of zero represented by $V_T$, the output voltage is zero but that for input voltages exceeding the threshold levels the output is linearly related to the input.

Figure 8:
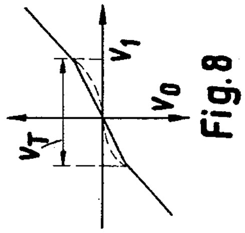

FIG. 8 shows a characteristic of a practical threshold device in which the low differential gain effective for signals of amplitude below the threshold levels changes to a higher value for signals of amplitude exceeding the threshold levels. The broken lines in the neighborhood of the origin denote the possible form of an alternative practical characteristic.

Figure 9:
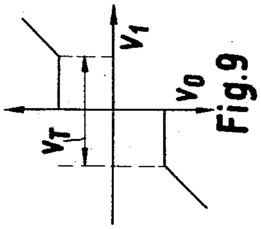

FIG. 9 shows the ideal form of a precorrection circuit suitable for compensating the transmission distortion introduced by the ideal threshold device represented by FIG. 7. It will be appreciated that by passing a given signal first through a device having the characteristic represented by FIG. 9 and then through a threshold device carrying the characteristic represented by FIG. 7, there will be obtained an output signal linearly related to the input signal.

Figure 10:
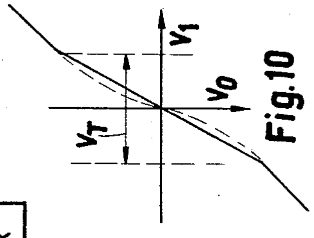

FIG. 10 represents the form of characteristic for a precorrection circuit which will compensate for transmission distortion introduced by a threshold device having the characteristic illustrated by FIG. 8. Signals of small amplitude are subjected to a relatively high differential gain while signals of amplitude exceeding the threshold levels indicated by $V_T$ are subjected to a lower gain. As in FIG. 8 the broken lines near the origin illustrate an alternative form of practical characteristic suitable for use to compensate for the characteristic similarly denoted in FIG. 8.

Figures 11, 13:
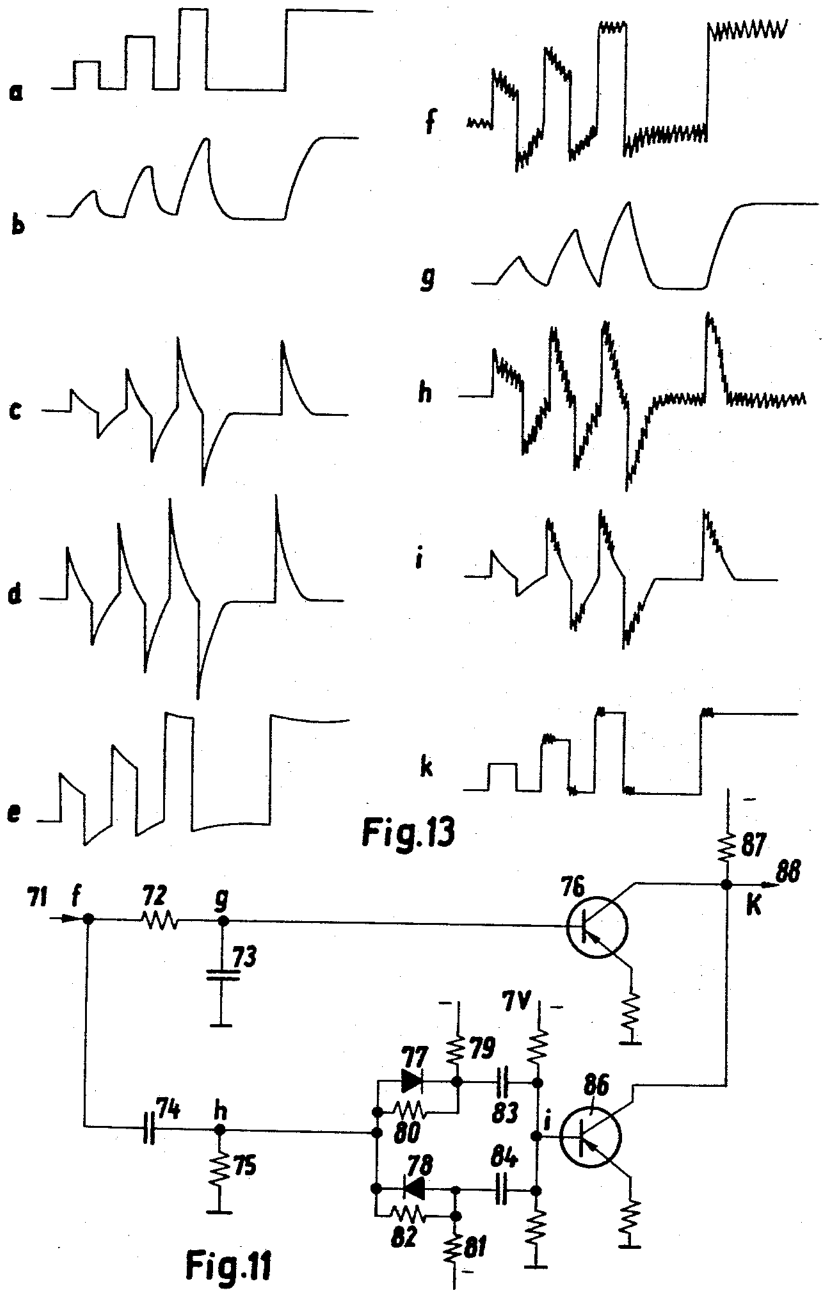
FIG. 11 shows the circuit of one embodiment of circuit means useful in carrying out the present invention.
FIG. 13 comprises a series of wavefrom diagrams illustrating the action of the circuit arrangements described in relation to FIGS. 11 and 12.

FIG. 11 is a circuit diagram of an embodiment of the circuit arrangement according to the invention using simple RC elements as high-pass and low-pass filters. A television signal received at an input terminal 71 is applied on the one hand to a low-pass circuit consisting of a series resistor 72 and a shunt capacitor 73, and on the other hand to a high-pass circuit consisting of a series capacitor 74 and a shunt resistor 75. The low frequency signal components appearing across the capacitor 73 are applied to the base of a transistor 76. The high frequency signal components appearing across resistor 75 are applied to oppositely connected diodes 77, 78. Resistors 79, 80 connected from a voltage source to the cathode of diode 77 and in shunt with diode 77 respectively, ensure that diode 77 becomes conductive only when the signal amplitude exceeds a predetermined threshold level. Resistors 81 and 82 connected from a voltage source to the anode of diode 78 and in shunt with diode 78 respectively, similarly ensure that this diode also becomes conductive only for signals exceeding a predetermined threshold level in the opposite polarity. Signals passing through diodes 77, 78 are applied by way of respective capacitors 83, 84 to the base of a transistor 86. Transistors 76 and 86 share a collector load resistor 87 across which there appear the low frequency components transmitted through transistor 76 and the modified high frequency components transmitted through transistor 86. The recombined signal is fed out for use as required by way of an output terminal 88. The waveforms appearing at the lettered points *f . . . k* in the circuits are illustrated by correspondingly lettered waveforms given in FIG. 13.

Figure 12:
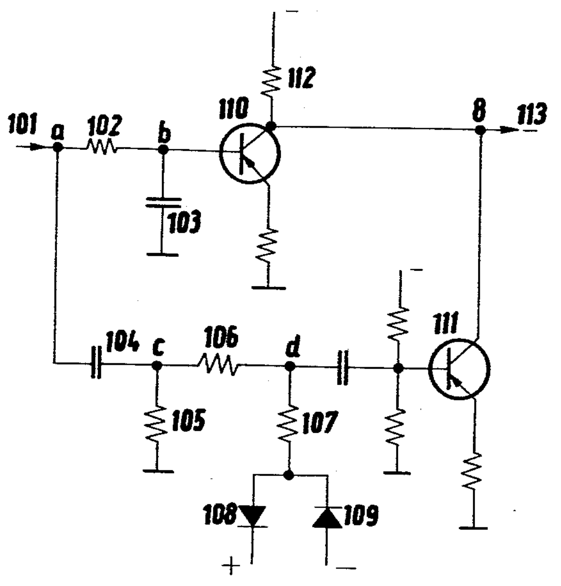
FIG. 12 shows another circuit arrangement useful in carrying out the present invention.

FIG. 12 shows a circuit arrangement suitable for producing precorrection of a signal at the beginning of a transmission channel employing apparatus according to the invention. The signal received at input terminal 101 is applied on the one hand to a low-pass filter consisting of a series resistor 102 and a shunt capacitor 103, and on the other hand to a high-pass filter consisting of a series capacitor 104 and a shunt resistor 105. The low frequency signal components appearing across capacitor 103 are applied to the base of a transistor 110. The high frequency signal components appearing across resistor 105 are applied by way of an amplitude-dependent voltage divider consisting of resistors 106, 107 and of diodes 108, 109 and by way of a capacitor to the base of a transistor 111. Owing to the action of diodes 108, 109 signals of small amplitude appearing across resistor 105 are less attenuated in their passage to the base of transistor 111 than are signals having an amplitude exceeding the threshold levels set by the bias voltages applied to diodes 108, 109. The low frequency components from transistor 110 and the modified high frequency components from transistor 111 are combined in the collector load 112 common to these transistors 111, 112 and the combined signal is fed out for use as required by way of an output terminal 113.

It is intended that all matter contained in the above description or shown in the accompanying drawings shall be interpreted as illustrative and not in a limiting sense.

What is claimed and desired to be secured by Letters Patent is:

1. Apparatus for increasing the signal-to-noise ratio of a television signal, comprising, in combination, means for dividing said television signal into a lower-frequency band and at least one higher-frequency band, a threshold circuit receiving said higher-frequency band and operating to transmit signals of which the amplitude is below a predetermined threshold level with a gain substantially less than that with which signals of which the amplitude exceeds said threshold are transmitted, the transmission factors operative with respect to said lower- and higher-frequency signal components being such that the maximum signal amplitudes in the output signal for said lower-frequency band and for the signals having passed said threshold are equal, and means for combining said signals having passed said threshold with said lower-frequency band to form a television signal of increased signal-to-noise ratio.

2. Apparatus for increasing the signal-to-noise ratio of a television signal, comprising, in combination, first dividing means for dividing said television signal into a lower-frequency band and at least one higher-frequency band, a non-linear circuit receiving said higher-frequency band and operating to transmit signals of which the amplitude is below a predetermined level with a gain substantially higher than that with which signals of which the amplitude exceeds said predetermined level are transmitted, means for combining the signals having passed said non-linear circuit with the signal of said lower-frequency band to form an output signal, transmitting said output signal through a transmission means for transmitting path at the output of which a higher signal-to-noise ratio appears, second dividing means for dividing said transmitted signal again into said lower-frequency band and at least one higher-frequency band, a threshold circuit receiving said higher-frequency band and having the inverse characteristic of said non-linear circuit, and means for combining the signals having passed said threshold with said lower-frequency band to form a television signal of increased signal-to-noise ratio.

3. Apparatus for increasing the signal-to-noise ratio of a television signal, comprising means for dividing said signal into a lower-frequency band and at least one higher-frequency band, means for applying said lower-frequency band and each said higher-frequency band to a threshold circuit operating to transmit signals of which the amplitude is below a predetermined threshold level with a gain substantially less than that with which signals of which the amplitude exceeds said threshold are transmitted, and means for combining the output from said circuit means with said lower-frequency band to form a signal of increased signal-to-noise ratio.

4. Apparatus for increasing the signal-to-noise ratio of a television signal, comprising means for applying said signal equally to a high-pass and to a low-pass filter, said filters having a common cut-off frequency, means for applying the output from said high-pass filter to a threshold circuit arranged to pass only signals of which the amplitude exceeds a predetermined level, a trigger device fed with output signals from said threshold circuit and operating to provide signals of constant amplitude coincident therewith, a connection from the output of said high-pass filter to an output terminal controlled by an electronic switch, a direct connection from the output of said low-pass filter to said output terminal, and means for applying output signals from said trigger device to close said electronic switch and allow signals from said high-pass filter to pass to said output terminal.

5. Apparatus for increasing the signal-to-noise ratio of a television signal, comprising means for dividing said signal into a lower-frequency band and at least one higher-frequency band, means for applying said higher-frequency band to a threshold circuit operating to transmit signals of which the amplitude is below a predetermined threshold level with a gain substantially less than that with which signals of which the amplitude exceeds said threshold are transmitted, said threshold circuit comprising in the signal path the parallel combination of two diodes connected in opposite polarity to one another, said diodes being biased so as to pass current only when the amplitude of an applied signal of appropriate polarity exceeds a predetermined threshold level, and means for combining the output from said threshold circuit with said lower-frequency band to form a signal of increased signal-to-noise ratio.

6. Apparatus for increasing the signal-to-noise ratio of a television signal, comprising means for dividing said television signal into a lower-frequency band and at least one higher-frequency band, means for applying said higher-frequency band to a non-linear circuit operating to transmit signals of which the amplitude is below a predetermined level with a gain substantially higher than that with which signals of which the amplitude exceeds said predetermined level are transmitted, means for combining the signals having passed said non-linear circuit with said lower-frequency band to form an output signal, means for recording said signal on magnetic tape, means for reproducing said recorded signal, means for dividing said reproduced signal into said lower-frequency band and at least one high-frequency band, means for applying the or each said higher-frequency band to a threshold circuit of which the characteristic is the inverse of said non-linear circuit and means for combining the signals having passed said threshold with said lower-frequency band to form a television signal of increased signal-to-noise ratio.

References Cited

Olson: Acoustical Engineering, pp. 420–422 (1957).

JOHN W. CALDWELL, *Acting Primary Examiner.*

R. L. RICHARDSON, *Assistant Examiner.*